Jan. 4, 1938.    C. I. McNEIL ET AL    2,104,373
MEASURING APPARATUS
Filed April 6, 1936
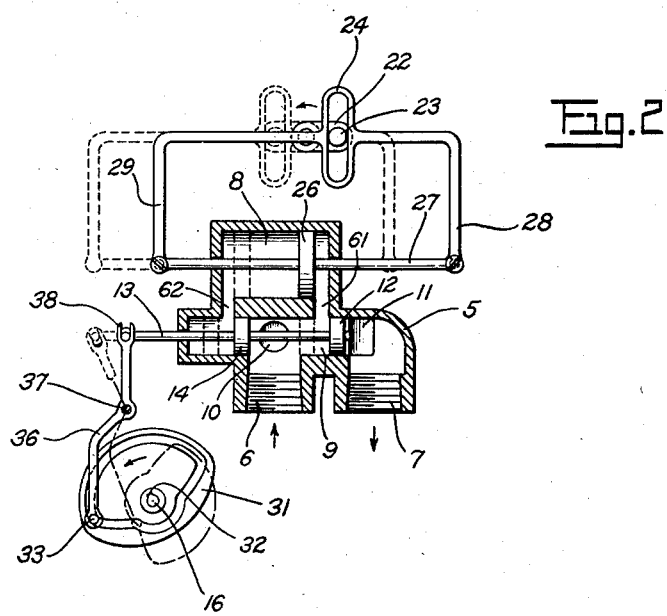
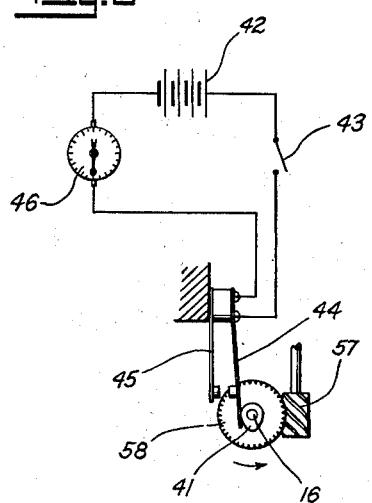
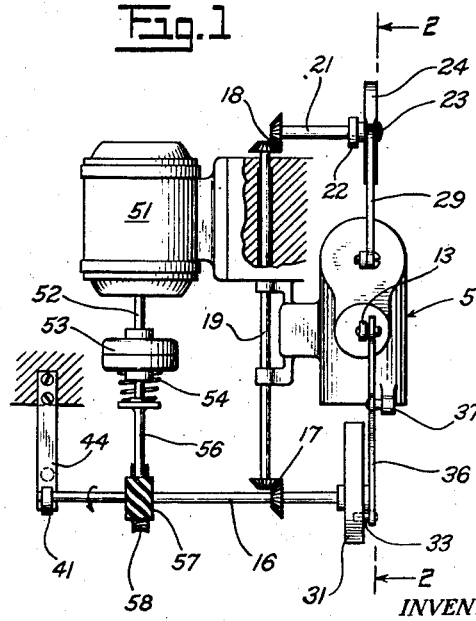
INVENTORS.
Charles I. McNeil
Raymond T. Zwack
BY
Martin J. Finnegan
ATTORNEY.

Patented Jan. 4, 1938

2,104,373

UNITED STATES PATENT OFFICE 2,104,373

MEASURING APPARATUS

Charles I. McNeil, Bloomfield, and Raymond T. Zwack, East Orange, N. J., assignors to Eclipse Aviation Corporation, East Orange, N. J., a corporation of New Jersey Application April 6, 1936, Serial No. 73,018

1 Claim. (Cl. 73—194)

This invention relates to fluid meters, and particularly to the measuring or indicating of the amount of flow of a fluid in a conduit which is entirely closed and filled by such fluid, and along which conduit the fluid moves only to the extent of its consumption at the conduit terminal.

Although the invention is particularly desirable for application to a closed conduit of the type used in internal combustion engine practice and terminating in a carbureter to which the conduit supplies combustible liquid such as gasoline, or terminating in a fuel injection mechanism to which the conduit supplies a similar combustible liquid of the hydrocarbon family, it is to be understood that the invention is applicable to the measurement or indication of the rate of flow of any fluid moving through a closed conduit to a point of consumption, within whatever limitations hereinafter appear either in the specification or the claim.

An object of the invention is to produce a fluid meter of the positive displacement type in which power producing the displacement is derived from a continuously operating prime mover acting upon the displacement producing means through a torque transmitting mechanism of predetermined capacity adapted to automatically permit transmission of the drive to the displacement producing means only to the extent required by the rate of consumption of fluid at the conduit terminal. As thus broadly considered the invention includes the concept of the novel means of measuring fluid flow in a closed conduit, which novel means includes the structure for applying a constant pressure to the fluid at some point along its conduit, and converting such constant pressure into movement of the fluid only to the extent of consumption of the fluid at the conduit terminal, together with means of exhibiting an indication of the rate of such movement.

These and other objects of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claim for this purpose.

In the drawing:—

Fig. 1 is a schematic view in elevation except for certain sectioned parts of the preferred embodiment of the invention;

Fig. 2 is a view partly in elevation and partly in transverse section along the line 2—2 of Fig. 1; and Fig. 3 is a diagrammatic view of the means for registering an indication of the rate of movement of the flow controlling pistons.

In the drawing, reference character 5 designates a meter having an inlet passage 6, an outlet passage 7, a pair of fluid receiving chambers 8 and 9, and by-pass ports 10 and 11 constituting the inlet and outlet of an auxiliary or emergency by-path around the piston 12, the latter being secured to a piston rod 13 along with a second piston 14, the stroke of each piston being such as to move them from the full-line positions indicated in Fig. 2 to the dash-line position, in response to rotation of the driving shaft 16 of Fig. 1. Also responding to the rotation of the driving shaft 16, through the intermediary of the connecting bevel gear sets 17 and 18 and the shaft 19, is a driven shaft 21 having a bearing surface to receive a crank arm 22, the crank pin 23 of which engages a Scotch ycke 24 to reciprocate the latter between the two extreme positions indicated respectively in dash and in full lines in Fig. 2; and by such reciprocation to produce a corresponding stroke of the piston 26 within the chamber 8, the connections between the Scotch yoke and the piston 26 including a piston rod 27 and the connecting links 28 and 29. Similar means may be employed in translating the rotation of shaft 16 into a reciprocating movement of the piston rod 13, but as shown, such translation takes a somewhat different form including a cam 31 secured to the shaft 16 as indicated at 32 and having a follower 33 connected to a bellcrank 36 pivoted to the frame of a stationary device or an extension of the housing 5 as indicated at 37 in Figs. 1 and 2 and having its upper end bifurcated as indicated at 38 to receive a pin on the end of piston rod 13 to produce rectilinear movement of the pistons 14 and 12 in response to rotation of the shaft 16.

At the end of the shaft 16 opposite to that which receives the cam 31, there is a second cam 41 as best shown in Fig. 3, adapted to make and break a circuit leading from a source 42 to a manually operable switch 43 and the make and break contacts 44, 45 to an impulse responsive registering device 46 calibrated to indicate the rate of flow through the meter 5. The drive for the shaft 16 is shown as being constituted by an electric motor or other prime mover 51 from which extends a shaft 52 terminating in a friction clutch 53 having a torque transmitting capacity which depends upon the amount of pressure exerted upon the friction surface by a spring 54, the driven element of the clutch having connection with a shaft 56 terminating in a worm 57 meshing with a worm gear 58 on the shaft 16 to transmit rotation to the latter at a reduced speed.

Assuming the parts to be functioning normally (so that the by-pass ports 10 and 11 will be ineffective—that is not required to function), and also assuming a constant supply of the fluid to be measured to the inlet 6 and a continuous although variable consumption of the fluid emerging from the outlet 7, but only to the extent that such fluid is consumed—in other words, there being a closed conduit from the point 7 to the point of consumption—energization of motor 51 will cause, through the connections above described, reciprocation of the piston rods 13 and 27 and a resulting periodic delivery or "pumping" of fluid, first from the chamber 9 into the right-hand section of the chamber 8, and secondly, from the said right-hand section of the chamber 8 to the outlet 7 as soon as the piston 12 moves sufficiently to the left to connect the port 61 with the said outlet 7. Concurrently with this pumping action on the right-hand side of the piston 26 there is a corresponding pumping action on the left-hand side thereof as the piston 14 moves to alternately cover and uncover the passage 62, but in each case the rapidity of movement is governed by the rapidity by which the fluid in the closed conduit leading from the outlet 7 is consumed. That is, when the rate of consumption is relatively low there is a relatively longer period before sufficient displacement of fluid takes place to permit a full stroke of the pistons and hence there is relatively greater resistance to the constant effort of the driving shaft 52 to produce corresponding rotation of the driven shaft 16, with a consequent slipping of the clutch 53 to a relatively high extent, the spring 54 yielding to the extent necessary to protect the drive shaft 52 from this relatively high resistance reflected back to the clutch by reason of the resistance in the piston chambers 8 and 9. As the rate of consumption of the fluid increases and the rate of reciprocation of the pistons increases correspondingly, there is proportionately less slipping of the clutch 53 and the resulting acceleration of the shaft 16 is reflected in the increase in the number of electrical pulsations imparted to the electromagnetic indicating mechanism 46 the latter being of any well-known and suitable type. The result is a true indication at the point 46 of the varying rate of flow through the meter 5.

It will be observed that the use of the slipping clutch 53 results in application of a constant pressure against the pistons (through their piston rods) at all times and at all rates of flow. That is, although the rate of movement of the pistons will vary with the rate of flow the pressure exerted upon the fluid by the pistons will not vary; hence the inaccuracies in readings, which result at relatively low rates of flow in meters of the type wherein the amount of friction varies, due to turbulence or other factors, with the quantity of flow being passed through the meter, are eliminated by use of the pre-set torque capacity drive shown at 51 to 56 inclusive in Fig. 1.

As above indicated the by-pass connected by the ports 10 and 11 is not intended to function except on failure of the driver 51 or some other part of the piston actuating mechanism and therefore the said relief by-pass need not be further illustrated or described, except to point out that it will be normally closed by a valve or other suitable device which opens or is opened only when such emergency occurs.

It will be understood that changes in the construction may be made within the scope of the appended claim.

What is claimed is:

In combination with a closed conduit, a fluid receiving, piston containing cylinder in said conduit, a piston in said cylinder, means for directing a flow of fluid into the chambers of said cylinder located on both sides of said piston, to resist both forward and return movement of said piston, means including a part operable to apply a constant pressure on said piston to tend to continue the latter in sliding motion within said cylinder against the resistance of said fluid, a controller driven by said part, and means responsive to the amount of movement of said controller to indicate the amount of flow along said conduit.

CHARLES I. McNEIL.
RAYMOND T. ZWACK.